United States Patent [19]

Ando et al.

[11] 4,092,496

[45] May 30, 1978

[54] VARIABLE IMPEDANCE DETECTING CIRCUIT FOR A TELEPHONE LINE AUXILIARY DEVICE

[75] Inventors: Shizuo Ando; Hiroshi Mizuno, both of Kawagoe, Japan

[73] Assignee: Pioneer Electronic Corporation, Tokyo, Japan

[21] Appl. No.: 730,564

[22] Filed: Oct. 7, 1976

[30] Foreign Application Priority Data

Oct. 9, 1975 Japan .................. 50-122272

[51] Int. Cl.² ............................................. H04M 1/64
[52] U.S. Cl. .............................. 179/6 R; 179/15 W; 179/2 A; 179/84 R
[58] Field of Search ............ 179/6 R, 2 A, 84 R, 179/84 A, 15 W, 1 C, 6 C, 6 AC, 6 E

[56] References Cited

U.S. PATENT DOCUMENTS

| | | | |
|---|---|---|---|
| 2,147,820 | 2/1939 | Milde | 179/6 R |
| 3,649,762 | 3/1972 | Okamura | 179/6 R |
| 3,688,038 | 8/1972 | Hugyecz et al. | 179/84 R |
| 3,688,044 | 8/1972 | Konno | 179/6 R |
| 3,716,673 | 2/1973 | Meri | 179/6 R |
| 3,818,141 | 6/1974 | Jacobson | 179/6 R |
| 3,941,941 | 3/1976 | Simokat et al. | 179/84 R |

*Primary Examiner*—Raymond F. Cardillo, Jr.
*Attorney, Agent, or Firm*—Sughrue, Rothwell, Mion, Zinn and Macpeak

[57] ABSTRACT

An automatic telephone answering device includes a diode bridge rectifier having its input terminals connected across a pair of telephone lines through a first switch, and its output terminals connected across a relay coil through a voltage controlled impedance, such as a Zener diode. A relatively high frequency, high voltage call signal is rectified by the bridge and breaks down the diode to energize the relay coil. This closes a relay switch to actuate a control circuit, whose outputs a) actuate a tape recorder unit to play back a prerecorded message to the caller, and b) simultaneously transfer the first switch to connect the tape recorder unit across the telephone lines through a line transformer. The breakdown voltage of the Zener diode is selected to be above the voltage level produced by sound (conversation) signals and busy tone signals, whereby the device presents a high impedance to such signals and is not actuated thereby.

6 Claims, 2 Drawing Figures

VARIABLE IMPEDANCE DETECTING CIRCUIT FOR A TELEPHONE LINE AUXILIARY DEVICE

BACKGROUND OF THE INVENTION

1. Field of the Invention

This invention relates in general to a supplementary device for use in telephone communications which carries out a given operation in response to the reception of call signals sent out over a telephone line, and more particularly to a variable impedance, non-interfering, automatic telephone answering device.

2. Description of the Prior Art

There have been proposed supplementary devices such as an automatic telephone device, a remote bell device, etc. which are connected in parallel to a telephone handset across a telephone line. Generally, when such a supplementary device is connected to a telephone line the associated telephone handset is adversely affected, which results in the degradation or complete disruption of the communicating function. In order to avoid such problems various technical standards with respect to supplementary devices have been established by various regulatory agencies. One such technical standard requires that in an automatic telephone system or communicating battery system, the impedance value of the supplementary device during the reception of incoming signals must be more than 2KΩ per circuit at frequencies under 15Hz (ring up signal or call signal frequency).

As a result of this standard supplementary devices for domestic use are designed to have an impedance of 10KΩ to provide an adequate safety margin based on the supposition that (1) the supplementary device will be connected in parallel to a telephone handset having an impedance of about 10KΩ, (2) a plurality of supplementary devices will be connected in parallel across a telephone line, or (3) a parallel connection of different supplementary devices will be connected in parallel to a telephone handset. A further design criteria centers around the fact that the supplementary device may use the call signal as a source of its electric power.

An automatic telephone answering device, which is one type of supplementary device, receives call signals during the absence of a party, automatically plays back a prerecorded message to the caller, and then records a message from the caller. Such automatic telephone answering devices are constructed such that the call signals are fed to an introduction means whose output drives the control circuit of a tape recording unit. The call signal introduction means are designed to have an input impedance of 10KΩ in order to have no adverse influences on the associated communication system.

However, conventional supplementary devices are only designed to have relatively low impedances during the reception of call signals of 16–20Hz at a voltage of 70–100V r.m.s. Therefore, the impedance drops almost exponentially in the range of sound signal frequencies of 300–3400Hz and busy tone frequencies of 400Hz appearing over telephone lines.

In addition, when the sound signal frequency is relatively high the impedance value decreases to 1–2KΩ. As a result, when the supplementary device and a telephone handset are connected in parallel across a telephone line, and when a called party is answering the caller over the telephone, the input impedance of the supplementary device varies in response to the change of the sound signal frequencies. This varies the load impedance seen by the sound signal, which results in voice distortion, a decrease in message quality, such as voice articulation, and excessive sound signal loss at high frequencies.

SUMMARY OF THE INVENTION

Briefly, and in accordance with the present invention, the above drawbacks and disadvantages attendant with the prior art are overcome by providing an automatic telephone answering device which includes a diode bridge rectifier having its input terminals connected across a pair of telephone lines through a first switch, and its output terminals connected across a relay coil through a voltage controlled impedance, such as a Zener diode. A relatively high frequency, high voltage call signal is rectified by the bridge and breaks down the diode to energize the relay coil. This closes a relay switch to actuate a control circuit, whose outputs (a) actuate a tape recorder unit to play back a prerecorded message to the caller, and (b) simultaneously transfer the first switch to connect the tape recorder unit across the telephone lines through a line transformer.

The breakdown voltage of the Zener diode is selected to be above the voltage level produced by sound (conversation) signals and busy tone signals, whereby the device presents a high impedance to such signals and is not actuated thereby.

DETAILED DESCRIPTION OF THE PREFERRED EMBODIMENT

Figure 1:
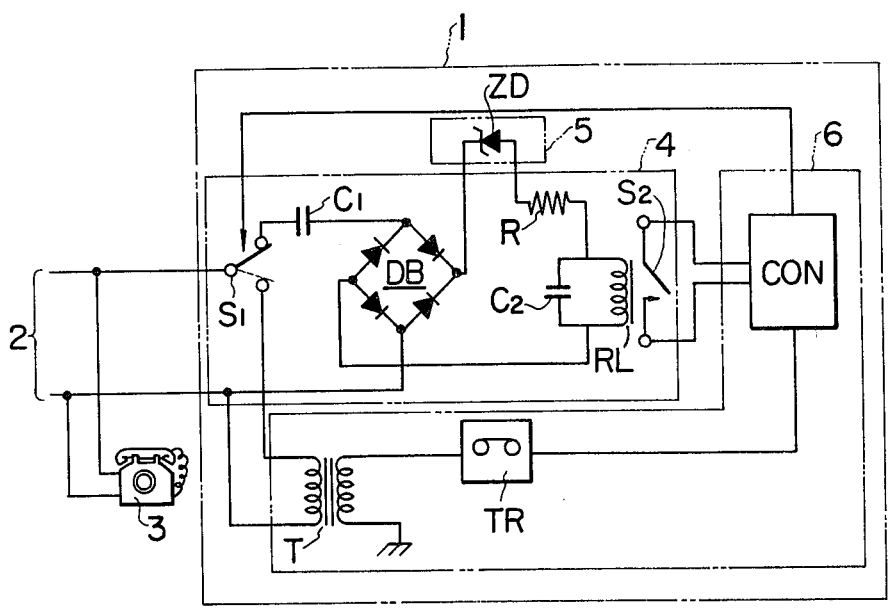
FIG. 1 shows a schematic circuit diagram of a telephone answering device in accordance with the present invention.

FIG. 1 shows an embodiment of a supplementary device according to the present invention in the form of an automatic telephone answering device 1, shown in dotted lines, connected in parallel with a telephone handset 3 across a pair of telephone lines 2. The automatic telephone answering device comprises a call signal introduction means 4, an impedance control means 5, and a conrol device 6. The call signal introduction means 4 includes a first circuit composed of switch $S_1$, condenser $C_1$, and diode-bridge DB in series, and a second circuit composed of resistor R with condenser $C_2$ in series and relay coil RL in parallel. The relay coil has an associated switch $S_2$.

One telephone line of the pair is connected to one input terminal of the diode-bridge DB through switch S1 and condenser $C_1$, and the other telephone line is directly connected to the other input terminal of the diode-bridge. The output terminals of the diode-bridge are connected to one side of resistor R through the impedance control means 5, and to one side of relay coil RL. The other side of resistance R is connected to the other side of relay coil RL. The impedance control device 5, shown here as a Zener diode ZD, is connected between one output terminal of diode-bridge DB and resistor R, and is so arranged that its anode is coupled to the positive terminal of the diode-bridge. The control device 6 comprises a control circuit CON actuated by the closure of relay switch $S_2$, a tape recorder TR for delivering a prerecorded message in response to a signal from the control circuit, and a line transformer T for transmitting the tape recorder output to the telephone line 2 through switch $S_1$.

In operation, a call signal is applied through normally closed switch $S_1$ and condenser $C_1$ across the diode-bridge DB, which produces a pulsating, full-wave rectified current at the output terminals of the bridge. This output current breaks down the Zener diode ZD and energizes the relay coil RL through the resistor R, to thereby close the switch $S_2$. This actuates the control circuit, whose outputs transfer the switch $S_1$ to connect the line transformer T across the telephone lines 2, and simultaneously actuate the tape recorder TR. The prerecorded message is then played back to the caller over the telephone lines through the line transformer T and switch $S_1$. On completion of the message playback, the switch $S_1$ is returned to its initial position and the device is returned to a stand-by mode in readiness for a succeeding call signal.

Many telephone answering devices include a function whereby messages from callers may be recorded, although such a function is not shown in this embodiment in the interest of simplicity and since it forms no part of the present invention.

It is necessary that the breakdown or Zener voltage of the constant-voltage diode ZD be lower than the minimum voltage level provided by a call signal and higher than the maximum voltage level produced by sound signals and busy tone signals. Under such conditions the input impedance of the introduction means 4 becomes low to call signals due to the conduction of the diode, whereby the impedance (e.g. $10K\Omega$) is primarily determined by the values of condenser $C_1$, resistor R, relay coil RL and condenser $C_2$. In the case of sound signals and busy tone signals, on the other hand, the diode ZD remains non-conductive, whereby the introduction means 4 presents a high impedance, primarily determined by the leakage resistance of the diode-bridge DB. As a result, even when a called party is talking with a caller over the telephone handset, since the automatic telephone answering device 1 receives only sound signals over the telephone lines, it remains in its high impedance condition and does not affect or attenuate the sound signals. Call signals, on the other hand, are immediately and positively responded to by the automatic answering device 1 owing to their relatively higher voltage levels.

Figure 2:
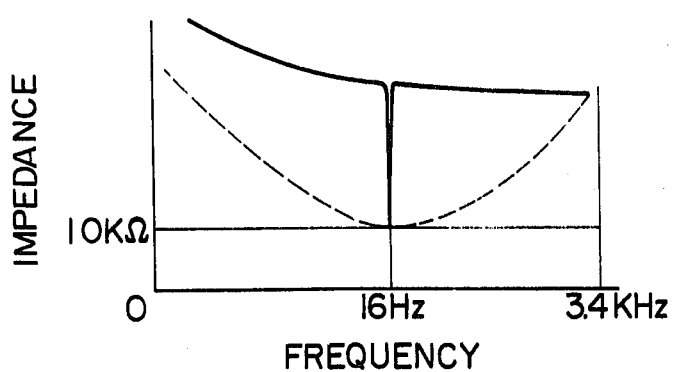
FIG. 2 shows a characteristic curve for explaining the present invention.

Thus, the call signal introducing means 4 of the automatic telephone answering device is designed so that its impedance viewed from the telephone lines 2 is low (about $10K\Omega$) to 16Hz call signals and high to other signal frequencies, as shown by the solid line in the impedance vs. frequency plot of FIG. 2. Morever, during operation in response to a call, the switch $S_1$ is transferred over to the line transformer. This effectively removes the entire introduction means 4 from the circuit, whereby the device offers no disturbance or disruption to the sound signals.

The Zener diode device precisely and accurately discriminates call signals from sound signals due to their voltage level differences. Thus, if the conduction or breakdown level is to be set at, for example, more than 10V r.m.s, then any constant-voltage device having a breakdown voltage of 10V may be used. The forward voltage drop of the diode-bridge DB is so small that it need not be taken into consideration, since as a practical matter a typical call signal level is in the range of 70–100V r.m.s., and therefore variations in the conduction and voltage characteristics of the individual diodes are practically negligible.

In the foregoing, although only an automatic telephone answering device has been disclosed, the principles of the present invention are equally applicable to a remote bell device or the like used for alerting a called party. Further, although only a constant-voltage diode has been disclosed as the impedance control means, any voltage-variable resistance element may be used, such as a varistor.

What is claimed is:

1. Variable impedance detecting circuit for a telephone line auxiliary device including a pair of telephone lines for transmitting relatively low frequency, high voltage call signals and relatively high frequency, low voltage sound signals and busy tone signals, comprising:
   (a) voltage-controlled variable impedance means for presenting a low impedance to incoming call signals and a high impedance to incoming sound signals and busy tone signals,
   (b) circuit means for producing an output signal in response to the presentation of a low impedance by said variable impedance means comprising a diode bridge rectifier having one input terminal connected to one of said telephone lines through a capacitor and a first switch and the other input terminal directly connected to the other of said telephone lines, a relay coil having one end directly connected to one output terminal of said bridge and the other end connected to the other output terminal of said bridge through said variable impedance means, and a second switch controlled by said relay coil, and
   (c) auxiliary circuit means operable in response to said output signal.

2. An auxilliary apparatus as defined in claim 1, wherein said auxilliary circuit means comprises a remote bell device.

3. Variable impedance detecting circuit as defined in claim 1, wherein said auxiliary circuit means comprises a tape recorder unit, and said output signal actuates said tape recorder unit and simultaneously transfers said first switch to connect said tape recorder unit across said telephone lines.

4. Variable impedance detecting circuit as defined in claim 1, wherein said variable impedance means comprises Zener diode.

5. Variable impedance detecting circuit as defined in claim 1, wherein said variable impedance means comprises a Zener diode, said other output terminal fo said bridge is a positive output terminal, and the anode of said Zener diode is connected to said positive output terminal.

6. Variable impedance detecting circuit as defined in claim 1, wherein said variable impedance means comprises a varistor.

* * * * *